Sheet 1
4 Sheets.
H. W. Hayden.
Making Brass Kettles.
No. 2,171. Reissued Feb. 13, 1866.
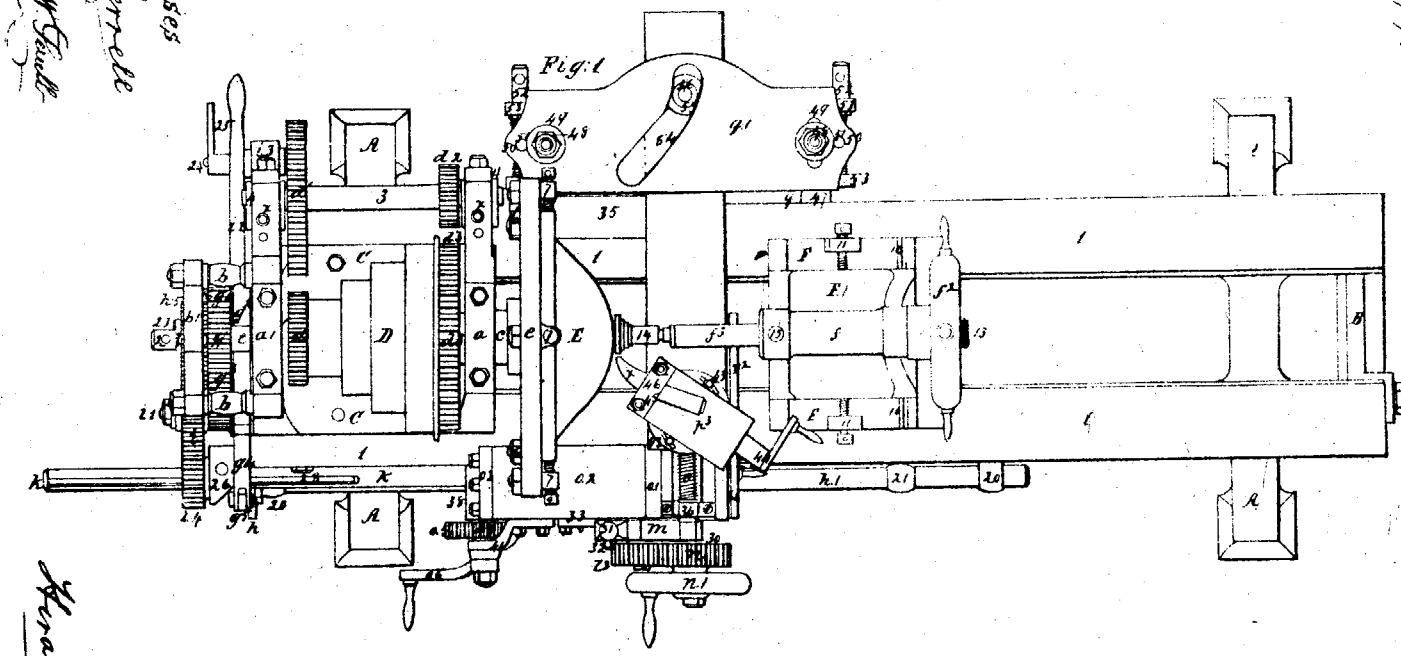
Witnesses
Wm Perrette
Samuel W. Foulk
Inventor
Hiram W. Hayden H. W. Hayden.
Sheet 2, 4 Sheets.
Making Brass Kettles.
No. 2,171. Reissued Feb. 13, 1866
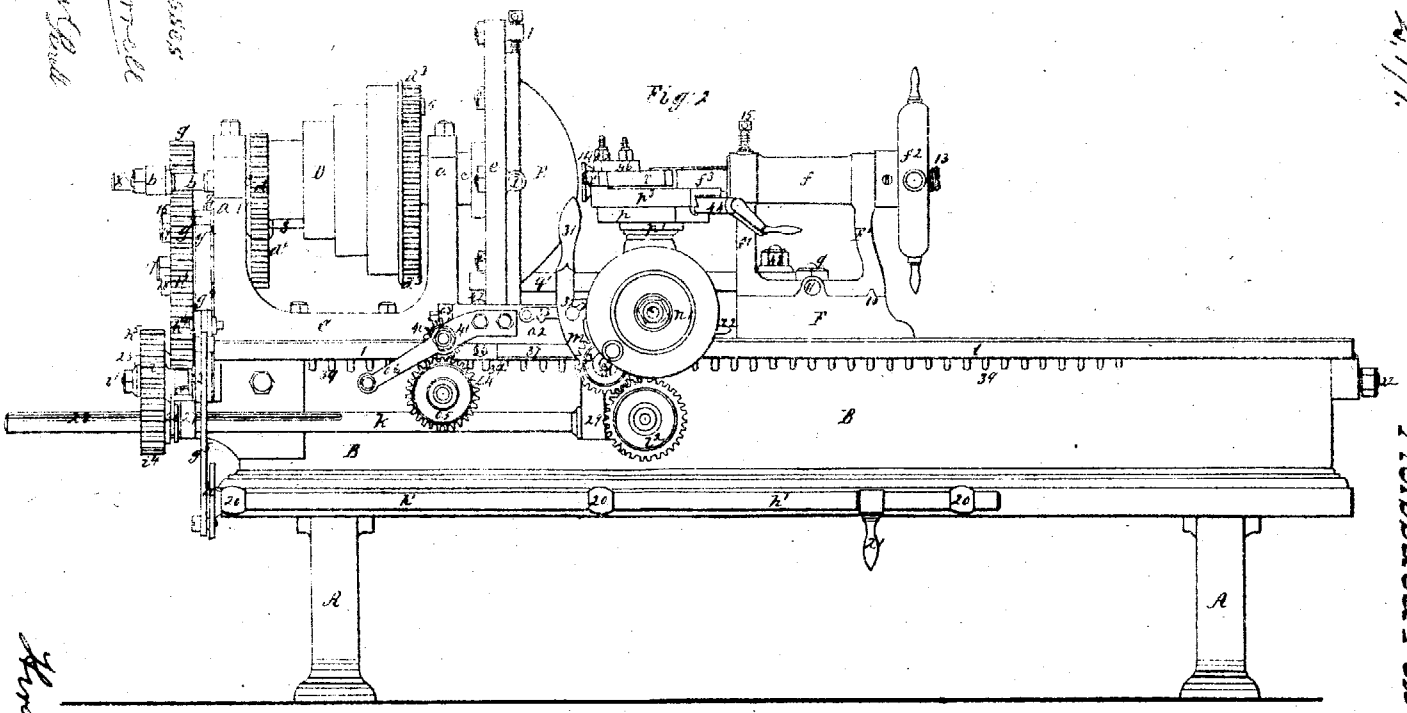
Witnesses
W. L. Sorrell
Ernest W. Sorrell
Inventor
Hiram W. Hayden Sheet 3.
4 Sheets.

H. W. Hayden.

Making Brass Kettles.

No. 2,171. Reissued Feb. 13, 1866.

Witnesses
W. C. Serrill
Lewis W. Pratt

Inventor
Hiram W. Hayden

H. W. Hayden.
Sheet 4
4 Sheets
Making Brass Kettles.
No. 2,171. Reissued Feb. 13, 1866.
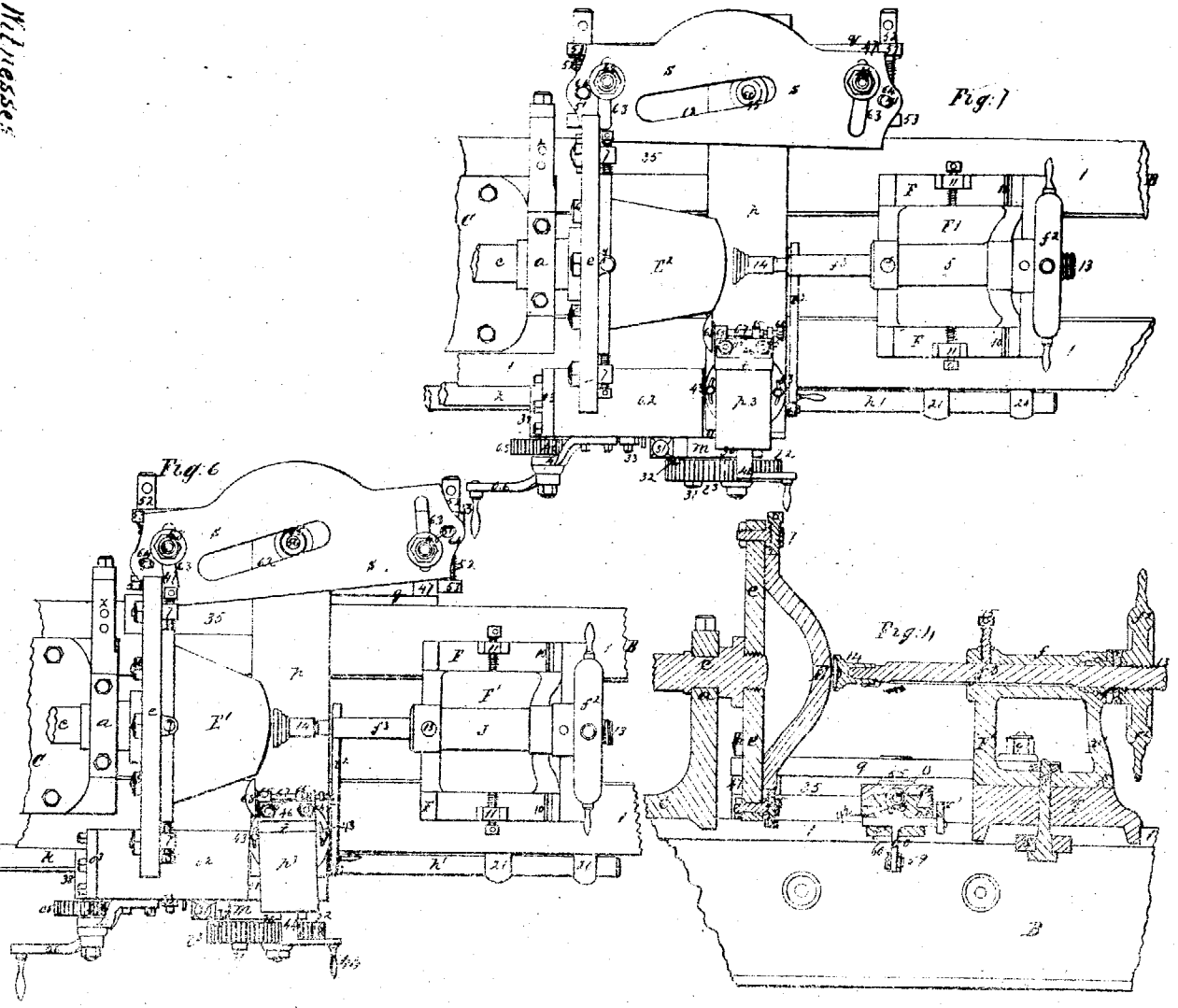
Witnesses:
W. Perrell
Samuel W. Farell
Inventor
Hiram W. Hayden

UNITED STATES PATENT OFFICE.

HIRAM W. HAYDEN, OF WATERBURY, CONNECTICUT.

IMPROVEMENT IN MACHINES FOR MAKING KETTLES.

Specification forming part of Letters Patent No. 8,589, dated December 16, 1851; extended seven years; Reissue No. 2,171, dated February 13, 1866.

*To all whom it may concern:*

Be it known that I, HIRAM W. HAYDEN, of Waterbury, in the county of New Haven and State of Connecticut, machinist, have invented, made, and applied to use certain new and useful Improvements in Machinery for Making Brass Kettles and Articles of like Character from Disks of Metal; and I hereby declare that the following is a full, clear, and exact description of the construction and operation of the same, reference being had to the annexed drawings, making part of this specification, wherein—.

Figure 2:
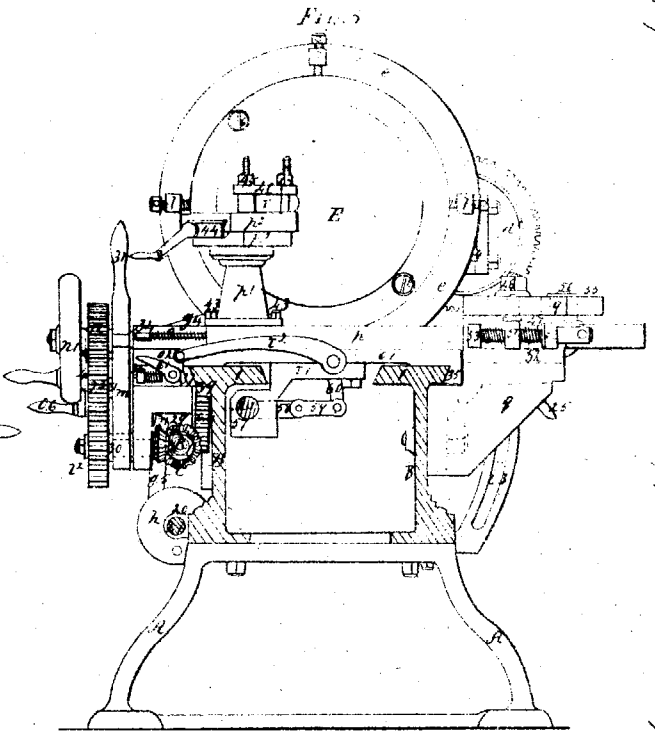
Figure 3:
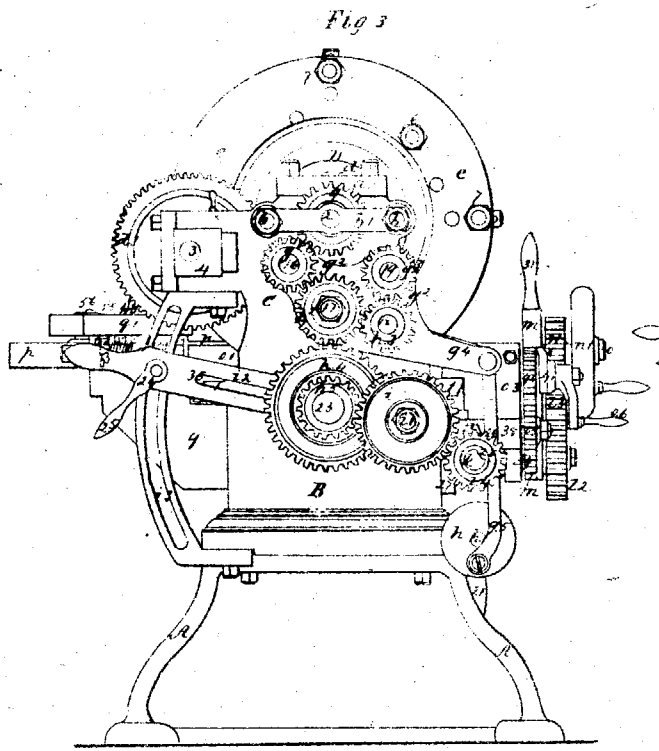

Figure 1 is a plan of the machine complete. Fig. 2 is a side elevation, and Fig. 3 is an end elevation. Fig. 4 is a longitudinal section of the form, slide-rest, and puppet-head; and Fig. 5 is a cross-section of the machine near the slide-rest, looking toward the mandrel and form.

The other figures are separately referred to, and the like marks of reference denote corresponding parts in all the figures.

Before proceeding to describe my machine I will give a short account of the ordinary process of making kettles of brass or other metal, in order that the operation and advantages of my machine may be more clearly understood. A disk of metal of the proper size is stamped between dies, gradually stretching the bottom and compressing the sides together, and this has to be performed several times to draw the metal into the right shape, and at each stamping the metal has to be annealed, which stamping and annealing stretch, distress, and injure the metal, rendering it soft, porous, and weak at the very point where the kettle is most liable to injury, and large kettles having to be stamped sometimes ten to twelve times, and annealed each time. When the kettle is completely shaped, the metal is so softened that it has usually been hammered or what is termed "spotted" to give hardness and temper to the metal, and this hardening is uneven in its operation, and distresses the metal, making it thinner in some places than in others; but the greatest difficulty with the old process is this, that the die as it is forced into the matrix carries the metal with it, tending all the time to shove the bottom off from the sides, and by consequence stretching the metal most at the angle formed between the bottom and the sides, rendering the metal thinnest at this point, the very point where most liable to injury, and where blows and bruises usually are received, and the large-size edges of the sheet having to be drawn into a smaller compass to form the top of the kettle are compressed and made thick near the top, where there is little wear, and where it is supported by the wiring. Consequently the old process makes the kettle thick where it should be thin and thin where it should be thick, and the process of hammering, although producing a better article than stamping, still has the same disadvantage of making the metal thin in the wrong place.

My improvements, as distinguished and contrasted with the foregoing, consist in the arrangement of mechanical means to secure a circular disk of metal against the center of a form, so that it is rotated with the form, and then bringing a proper tool to bear against the disk, and gradually moving the tool by the machinery as the disk is rotated, bending the metal and compressing it gradually upon the form, the tool operating so as to compress the bottom onto the shape of the form and gradually thin it, and then to draw the sides out straight and gradually thinner on the forms, which forms are made successively smaller near the top of the kettle, the bottoms remaining the same, and the straight sides coming less conical until the last form is of the proper shape and height to form the complete kettle. The bottom, always being formed by the first operation, is not changed by the subsequent operations of stretching and thinning the sides, the bottom and sides being tapered from the center of the bottom, where the disk is of its original thickness, to the top of the kettle, which finally receives and is supported by the wiring, which is put in as usual.

By my machinery the largest-sized kettles or "brass batteries," as they are sometimes called, are completely formed by the use of five or six molds, and the annealing has to be done only a corresponding number of times, being on the blank and between each successive operation.

The operation of the tool on the kettle is similar to rolling, drawing the metal out with a spring, temper, and elasticity equal to rolled metal, and of an even hardness and homogeneous texture, and the kettle is formed thickest in the part where there is most wear.

Having thus described the general operation and the advantages of the articles manufactured by my machine, I will now proceed to detail the construction and arrangement of the means employed to produce the above-mentioned result.

In the accompanying drawings, A A are legs or a frame supporting a bed, B, made similar to the bed of a lathe, with slides 1 1 on the top, as usual.

C is a mandrel-head formed with journal-boxes $a$ $a'$, receiving the mandrel $c$, the end-wise pressure on which is taken by the back set-screw, 2, in a cross-piece, $b'$, on short columns $b$, nearly as usual.

Between the journals $a$ and $a'$ the mandrel $c$ has around it the conical pulleys D, set loose on the mandrel, as usual, and having on their smaller end a pinion, $d$, taking a wheel, $d'$, on a short shaft, 3, set in adjustable sliding journals 4 on the mandrel-head C, with pins $x$ passing through holes in the slides into the journal-box. These holes are so placed that the pins $x$ secure the journals so as to bring the wheel $d'$ into gear with the pinion $d$, or disconnect them, and on the shaft 3 is a pinion, $d^2$, taking a gear-wheel, $d^3$, which is secured on the mandrel; but the pinion $d^2$ is disconnected from the pinion $d$, the object of this being to give a slow powerful rotation to the mandrel $c$; but this may be used or not, as in ordinary lathes, and when not used the wheel $d^3$ is to be connected to the pulleys D by a bolt, the head of which is shown at 5, Fig. 2, which is to be screwed into a hole in the end of the conical pulleys D, as usual. The mandrel $c$ has on its nose the face-chuck $e$, made as usual and turned true, which has holes through it to receive the screw-bolts 6, with their nuts, that secure the rotary forms. The first one of these is shown in Figs. 1 and 2, (marked E,) and 7 are screws to adjust the form to the central position on the chuck; but the means of adjusting and securing the form to the chuck are to be those best adapted to the purpose.

F is a sliding bed in the slides 1 1, taking by a cross, V, slide 10, the puppet-head F′ of the lathe, and these both are secured by a clamp-piece, 8, beneath the slides 1 1, through which a bolt, 9, passes, with a nut above the bed of the puppet-head F′.

11 11 are adjusting-screws passing through ears on the bed F, taking the sides of the bed F′ to adjust it across the machine. This head F′ is formed with a pipe, $f$, connecting the tops of the ends, and inside this pipe $f$ is a short pipe, $f'$, (see Fig. 4,) secured by a pin and groove, and this pipe $f'$ is formed with or carries on its outer end a hand-wheel, $f^2$, the hub of which is formed with a female screw in its interior. The head thus formed receives the supporting-mandrel $f^3$, that has a groove taking a pin to prevent its turning, but allows it to slide freely lengthwise, and this mandrel $f^3$ fits the pipe $f$ on its end next the chuck $e$, but the back end is made larger, with a screw-thread, 13, around it, that fits the screw in the hand-wheel $f^2$. The object of this arrangement is that by turning the wheel $f^2$ until it has drawn the supporting-mandrel $f^3$ back till its screw 13 is disengaged the mandrel $f^3$ can be slid back out of the way, so as to be able to remove the kettle without moving the head F′, and also without losing time to screw the mandrel $f^3$ back, which would be the case if the mandrel had a screw-thread its whole length. The end of this mandrel $f^3$ opposite to the screw 13 is turned smaller and to a center, which receives a socket, 14, and allows it to rotate freely. This socket 14 has a small disk on its end, with a small cavity in the center.

The circular blank or disk of metal to be operated on has a blunt center punch-mark in the center, the convex side of which, taking the cavity in the face of the socket 14, forms a guide to bring the sheet to the right place for all the operations, and when the kettle is completed this punch-mark is to be beat down flat again. The disk of metal is to be placed against the form, and the mandrel $f^3$ shoved up till the screw 13 is taken by the screw of the wheel $f^2$, and the mandrel $f^3$, with its socket 14, being forced strongly up onto the sheet of metal (which is to be so placed that its center mark enters the cavity in the socket 14) by turning the wheel $f^2$ to give the required pressure, and clasp the disk firmly between the socket 14 and form E, the disk and socket rotating with the form. On power being applied, the socket rotating on the end of the mandrel $f^3$, and a tightening-screw, 15, may be used to bind the mandrel tight in the tubular bearing $f$. These being the means of securing and rotating the form or mold and the disk, the means of sustaining and moving the tool, to operate on the sheet are next to be described.

$g$ is a gear-wheel near the end of the mandrel $c$, outside the head C, through which the power is communicated to drive the other parts.

17 is a center on the head C, receiving a flat frame, $g^2$, which carries two pinions, $g'$ and $g^3$, on stud centers 16 and 19. The pinion $g'$ gears to a wheel, $h^2$, on the center 17, and an intermediate pinion, $h^3$, on a center, 18, also on the frame $g^2$, connects the wheel $h^2$ and pinion $g^3$, the object of this being to give the wheel $h^2$ a rotation in either direction, and by consequence all the parts connected to it, for a purpose hereinafter shown, the wheel $g$ rotating in the same direction all the time. If the frame $g^2$ is moved on its center 17, so as to connect the pinion $g'$ to the wheel $g$, the wheel $g'$ and the wheel $h^2$ will be rotated in the same direction; but if the pinion $g^3$ is connected to the wheel $g$, by moving the frame $g^2$ the wheel $h^2$ will go in the opposite direction to the wheel $g$, and the frame $g^2$ can be so set that neither the pinions $g'$ or $g^3$ touch the wheel $g$, so that the wheel $h^2$ is not moved. The frame $g^2$ is moved by means of an arm, $g^4$, with a link, $g^5$, to a small disk, $h$, on the end of shaft $h'$, set in bearings 20, with a handle, 21, to rotate the shaft, and either raise or lower the arm $g^4$, as is usual in lathes.

$h^4$ is a gear-wheel taking the wheel $h^2$, and has a pinion, $h^5$, formed with or connected to it to communicate motion to a wheel, $i$, that is on one end of a screw, $i'$, which runs the whole length of the machine inside the bed, for a purpose hereinafter set forth, and is secured at the other end by a nut and washer, 22, outside the bed B. The journal through which the screw $i'$ passes, near the wheel $i$, is formed as a short pipe from the bed B, and receives around its outside the eye of a lever, $i^2$, that is formed with a slot to receive the center 23 of the wheel $h^4$, and a pinion, $h^5$, so as to bring the pinion $h^5$ into gear correctly with the wheel $i$, and adjust in case of wear. The lever $i^2$ extends toward the back of the machine and terminates as a handle, and has a screw-pin, 24, and nut 25, with a lever to turn it. This pin 24 passes through a curved slot, $i^3$, which is secured to the bed B and head C, the slot being the arc of a circle to the center of the screw $i'$. The object of this lever is to bring the wheels $h^2$ and $h^4$ properly together, or entirely disconnect them, and also allow different-sized wheels to be put in to regulate the speed. The wheel $i$ gears to a pinion, $i^1$, which is set on a shaft, K, that has a long key-seat to take a key secured in the pinion $i^1$, so that the shaft K can be given a rotary motion, but still allowed to slide lengthwise through the pinion. The shaft K is supported in a journal, 27, on the bed B, and the pinion $i^1$ is retained in place by a fork, 26, coming from the journal 27 over and into a groove around the boss of the pinion $i^1$. The shaft K is supported at the other end in a journal, 29, depending from the under side of the bed $o'$ of the slide-rest, and has a miter-wheel, $l$, on its end, taking a similar miter-wheel, $l'$, on a short shaft passing through a pipe-journal, 30, depending from the bed $o'$.

$l^2$ is a gear-wheel secured on the end of this short shaft, taking an intermediate pinion, $l^3$, which is set on a center, 81, on a lever, $m$, the eye of which sets over the pipe-journal 30, the other end being formed as a handle, 31.

32 is a screw passing through a slot in the lever $m$ into the part $o'$, which slot is of sufficient length to allow the lever $m$ to be moved sufficient to connect or disconnect the pinion $l^3$ with a wheel, $n$, and a stop or blocking-piece, 33, set on a screw on the bed $o'$, retains the lever in place to connect the pinion $l^3$ to the gear-wheel $n$. This wheel $n$ is set on a shaft, $o$, formed as a screw, and supported by a journal, 34, near the end of the cross-sliding bed $o'$ of the slide-rest, and the screw-shaft $o$ has on its outer end, near the wheel $n$, a hand-wheel, $n'$, whereby the screw $o$ can be rotated. The bed $o'$ of the slide-rest is formed to go across the machine on the slides 1 1, and has a slide, 35, at the back edge, taking under the beveled outside edge of the slide 1, and is formed with a bed, $o^2$, on the front of the machine, which has flanges on the under side, taking set-screws 36, the points of which enter and adjust a sliding plate, 37, that takes the bevel on the outer edge of the slide 1 on this side, so as to allow the bed $o'$, with its parts $o^2$ and $o^3$, to slide freely on the slides 1, but be secure in place.

$o^3$ is a plate on the end of the bed $o^2$, passing downward and terminating as a pipe, 38, that receives through it a short shaft that has on its inner end a pinion, $o^4$, taking a rack, 39, on the under edge of the slide 1.

$o^5$ is a gear-wheel on the outer end of this shaft, taking a pinion, 40, which is mounted on a short shaft centering in the plate $o^3$, and a bracket, 41, outside sustains the pinion, and a handle, $o^6$, connected to the shaft of this pinion, enables the operator to run the slide-rest and parts attached back when desired if the slide-rest is not otherwise retained in place. The screw $o$ enters a nut, 42, on the under side of the slide $p$, which is formed with beveled sides, as usual, and this slide $p$ takes the column $p'$, which is secured by a center-pin in the slide $p$, and has a flange with bolt 42 to secure it in place, and this flange is to have a second set of holes to take the bolts 43 and secure the column when turned into another position, for a purpose hereinafter set forth; or the screws that hold the column $p'$ to the slide $p$ may pass up through the slide $p$ from beneath into the column to secure it, as before. On top of the column $p'$ is a small slide-rest, $p^2$, with screw 44, taking a nut on the under side of the slide $p^3$, that carries and sustains by bolts and nuts 45 and clamp 46 the tool $r$, which operates on the disk of metal or partially-formed kettle to form the complete kettle. The tool is made rounding, as shown, so as not to cut the metal. $q$ is a bracket bolted on the back of the bed B, formed with a flat top, as seen in Fig. 5, and with a rabbet between it and the slide 1 to pass the slide 35, and this bracket $q$ has a flange, 47, at each end, on the top of each of which is a bolt, 48, that passes through a slot, 49, near each end of a pattern guide-plate, $q'$, and nuts and washers on the bolt 48 secure the plate $q'$ to the bracket $q$ after the pattern-plate $q'$ has been adjusted horizontally to the proper place, the slots 49 allowing of this adjustment, which is effected accurately, as follows:

53 are two ears on the outside faces of each flange 47, that receive a screw, 52, at each end of the bracket $q$, standing horizontally and at right angles to the slides 1, and these screws 52 pass through the ears 53, and are kept in place but allowed to turn by a pin behind the outer ear, 53, or other convenient means, and around each screw 52 is a nut, 51, that has a pin entering a hole, 50, near each end of the guide-plate $q'$, so that by turning the screws 52 the plate can be adjusted horizontally and into a nearly parallel line with the front side of the form then in use, and the nuts and washers on the bolts 48 retain the pattern-plate $q'$ firmly in place. Through this plate $q'$ is a slot, 54, of nearly the half-sectional shape of the form E, and receiving a roller, 55, on a strong pin, 56, near the back end of the slide $p$.

The operation of these parts is as follows: The operator disconnects the pinion $l^3$ from the wheel $n$ by removing the blocking-piece 33, and runs the slide $p$ back by unscrewing the screw $o$ by the hand-wheel $n'$, at the same time running the slide-rest $o'$ and parts connected back by the handle $o^6$ and pinion $o^4$ taking the rack 39, the roller 55 running in the slot 54 until it reaches, or nearly so, its back end. The operator now turns the handle of the screw 44, moving the slide $p^3$ and tool $r$ back out of the way. He then places a blank of metal in the machine and secures it against the mold E, as before described. He then runs the slide $p^3$ up, so that the tool takes against the disk of metal with the required degree of pressure. The proper point to which the tool is thus projected is determined by marks on the slide-rest $p^2$ and slide $p^3$, or by a screw-clamp (which is preferable) on the slide $p^3$, so that when the tool $r$ is projected to the proper place the clamp takes against the end of the rest $p^2$. In this position power is applied to rotate the chuck and disk, as described, which motion passes from the mandrel $e$ through the gearing, rotating the shaft K by the pinion $i^4$ taking the long slot 28, giving motion through the miter-wheels $l$ and $l'$ and wheel $l^2$ to the pinion $l^3$, which the workman connects to the wheel $n$ by the lever $m$ and blocking-piece 33, which rotates the screw-shaft $o$, drawing the slides $p$ toward the front of the machine. The tool $r$, standing near the socket 14, commences to operate on the disk, and if no other power operated on the slide $p$ the tool $r$ would be drawn out at a right angle to the slides 1; but the roller 55, being drawn forward in the slot 54, moves the slide $p$, rest $o'$, and part attached toward the mandrel-head C, the shaft K sliding through the pinion $i^4$, but being still rotated by the key and slot 28. The form of this slot 54 is such, and the pattern-plate $q'$ is so adjusted, that the tool compresses the disk of metal regularly as it is rotated, with the form E operating on the disk to draw it to the shape of the form, gradually thinning it from the center of the bottom; and the operation proceeding, the slot 54 causes the tool to draw the metal gradually thinner from the center until the edge is extended to the shape of the form E, and as thin as required in this first operation. I would here remark that the disks or blanks shaped by these means should be smaller than in the ordinary stamping process, as the extension and thinning of the top of the kettle brings it to the proper shape and size with considerably smaller blanks or disks. The blank disk of metal having thus undergone the first operation, the slides $p^3$ and tool $r$ are to be run back out of the way, the mandrel $f^1$ withdrawn, as described, the partially-shaped kettle removed from the form. The slide $p$ and slide-rest $o'$ are now run back, as before, another blank put in and secured, the slide $p^3$ run up to the proper place, and the parts put in motion as before; and when the required number of kettles have been thus partially formed and annealed, the machine is altered; or another or successive set of machines may effect the succeeding operations, the machine being constructed precisely the same as has been described up to this point, with the exception of the changeable parts, hereinafter set forth; but for the sake of clearness we will suppose the present machine to have the following parts brought into action, and the machine adjusted as follows:

I remove the first pattern-plate, $q'$, by taking off the nuts from the screws 48, and unscrew the screw $o$ by the hand-wheel $n'$ until the nut 42 runs off the screw $o$. I then take off the cap of the journal 34 and remove the screw $o$ and parts attached entirely; and having removed the form E, I put the second form, E', on the chuck $e$, (see Fig. 6,) and adjust it so as to run true. The bolts 43 are to be removed from the flange of the column $p'$, and the column given a partial rotation to the position shown in Fig. 6, and the bolts 43 put in a second set of holes, to hold the column $p'$ secure in place. The tool $r$ and nuts and clamps 46 being removed, a block, $t$, is to be set over the bolts 45 and the follower 46, and nuts again replaced. This block $t$ is made with ears forming bushes for a shaft, 67, on the end of which is a roller, 68, and the pressure on the roller is taken on the point of a set-screw, 66

Over the bolts 48 on the flanges 47 I place the slots 63 of the second pattern-plate, $s$, formed, as seen in Fig. 6, with a straight slot, 62, and adjust this plate horizontally, as before, by the holes 64 taking the pins 51, so that the edges of the slot 62 are nearly parallel with the front side of the mold E', but so as to make the metal thinnest near the top of the kettle; and this plate $s$ is secured in place by the nuts on the bolts 48. I now bring a clamp to bear to take motion from the screw $i'$, previously referred to. The way of effecting this will be seen in Fig. 5, wherein $r'$ is a flange on the under side of the slide $o'$, descending and having an eye, 57, to pass the screw $i'$, and through the side of the eye 57 is a mortise taking a slide screw-clamp, 58, that corresponds to the threads of screw $i'$.

59 is a link connected to the clamp 58, and to an arm, 60, passing through a slot in the flange $r'$, and formed with a small shaft setting in a hole formed in the flange $r'$ and bed $o'$, which shaft has on its outer end a lever, $r^2$. It will now be seen that when the lever $r^2$ is in the position shown in Fig. 5 the clamp 58 is disconnected from the screw $i'$, which rotates in the hole 57, without moving any of the parts; but when the lever $r^2$ is raised up and the blocking-piece 61 on the slide $o'$ placed under the end of the lever, the screw-clamp 58 is brought against the screw $i'$, which is kept from bending by the eye 57, and communicates motion to the slide $o'$ and parts attached to move them in either direction, according to which way the screw $i'$ is rotated by the gearing from the mandrel C. The kettle partially formed, as described in the foregoing, is now to be clamped firmly against the form E'. The bottom of this form E' is the same shape as the form E, the sides being brought nearly parallel the cavity in the socket 14, placing the partially-formed kettle centrally in the lathe and securing it onto the form E', as before. The slide-rest $o'$ is now to be run back by the handle $o^6$ until the roller 68 comes nearly opposite the commencement of the side of the form E', and the slide $p^3$, with its roller, is to be forced against the partially-formed kettle by the screw 44 to the required point, which may be determined by a gage or clamp, as before. The lever $r^2$ is now raised and the blocking-piece 61 put under it, the gear-wheels from the mandrel C to the screw $i'$ being set so as to rotate the shaft $i$ in the direction to draw the slide $o'$ and parts toward the mandrel-head C. The power now being applied rotates the form and partially-shaped kettle, and screws the slides $o'$ and $p$, with the roller 68, gradually toward the chuck $e$, the slot 62 giving pressure through the roller 55, slide $p$, and column $p'$ by the roller 68 on the kettle, and this roller, turning as the kettle and form is rotated, compresses and extends the metal till it sets close onto and is of the shape of the form E', and extended also in the length of the sides, while the mouth of the kettle has been decreased in diameter. The mandrel $f^3$ being withdrawn, the kettle is removed, as before, and the slide-rest run back by changing the direction in which the screw $i'$ rotates, or by disconnecting the clamp 58 and running back by the handle $o^6$, and the parts brought to bear on another partially-formed kettle, as before. It will now be seen that according to the size of the kettle it will be necessary to have forms that will draw the mouth of the kettle gradually smaller, bringing the sides nearer parallel. The conical sides of the mold being straight, all that is necessary is to have the pattern-plate $s$, with its slot 62, so adjusted that the slot stands nearly parallel with the side of the form at the point where the roller operates on the kettle, without the necessity of having a pattern-plate for each form; but I seldom have to use more than four or five forms to produce the largest size complete kettles. In the drawings only three forms are shown, the third form $E^2$, which produces the complete kettle, being shown in Fig. 7, with the pattern guide-plate $s$ and slot so adjusted that the slot 62 is nearly parallel with the front side of the form $E^2$, and this figure needs no further explanation, the mode of working and operation being the same as last described; and I would here state that the roller may be applied with the first form, or the tool $r$ in the subsequent operations, although I prefer to use them as herein set forth; and in this arrangement the angle formed between the bottom and sides of the kettle is not reduced in thickness, the roller commencing to operate with scarcely any pressure at this point, but gradually compressing the metal more and more as it operates nearer the top of the kettle.

I am aware that machinery has been made and used for compressing kettles and similar articles into form by dies, and also for the spinning or burnishing up conical or spheroidal forms, or forms of the same shape as a kettle, and the two processes of burnishing and stamping have been combined; but in this apparatus of mine the metal is stretched into form at the same time that it is compressed and thinned between two metallic surfaces, similar to rolling a flat sheet; and I am not aware that flat disks or blanks of metal have ever been stretched and compressed so as to extend the sheet and form a kettle of the proper thickness at the required place by means of the pressure of a proper tool, roller, or similar article moved by mechanical means while rotating with and on a proper form or mold of metal, the machine, when adjusted as described and shown, being self-acting and in contradistinction to guiding the tool by hand.

I do not claim any of the gear-wheels or pinions, nor their arrangement, except as hereinafter set forth, some of these being common in ordinary lathes; but

What I claim, and desire to secure by Letters Patent, is—

1. The combination of mechanism, constructed and arranged substantially as specified, for making kettles and similar articles in substantially the manner set forth.

2. The construction of the mandrel $f^3$, part of which is cylindrical and part fitted with a short screw, 13, to take the screw of the hand-wheel $f^2$, so that great pressure may be made at the point desired, while at the same time the mandrel can be easily and quickly moved through a long distance, for the purposes and as described and shown.

In witness whereof I have hereunto set my signature this 1st day of January, 1866.

H. W. HAYDEN.

Witnesses:
GEO. E. TERRY,
EDWARD J. RICE.